United States Patent [19]

Friedman

[11] Patent Number: 4,578,196
[45] Date of Patent: * Mar. 25, 1986

[54] METHOD AND SYSTEM FOR FILTERING COOKING OIL

[75] Inventor: Bernard Friedman, Allentown, Pa.

[73] Assignee: Oil Process Systems, Inc., Allentown, Pa.

[*] Notice: The portion of the term of this patent subsequent to Jul. 31, 2001 has been disclaimed.

[21] Appl. No.: 635,302

[22] Filed: Jul. 27, 1984

Related U.S. Application Data

[63] Continuation of Ser. No. 304,653, Sep. 23, 1981, Pat. No. 4,462,915.

[51] Int. Cl.⁴ ............................................. B01D 29/32
[52] U.S. Cl. .................................... 210/765; 210/167; 210/DIG. 8; 99/403; 415/121 G
[58] Field of Search ............... 210/167, 238, 416, 465, 210/DIG. 8, 138, 799, 470, 471, 765, 416.5; 99/403, 408; 415/121 G

[56] References Cited

U.S. PATENT DOCUMENTS

| | | | |
|---|---|---|---|
| 2,910,183 | 10/1959 | Hayes | 210/498 |
| 3,415,181 | 12/1968 | Hart | 210/DIG. 8 |
| 3,483,982 | 12/1969 | Nelson | 210/DIG. 8 |
| 3,581,896 | 6/1971 | Kuhlman | 210/167 |
| 3,616,907 | 11/1971 | Van Vleet | 210/DIG. 8 |
| 3,685,433 | 8/1972 | Cunningham | 210/DIG. 8 |
| 3,759,388 | 9/1973 | Thomason | 210/DIG. 8 |
| 3,802,806 | 4/1974 | Blum | 415/214 |
| 4,052,319 | 10/1977 | Friedman | 210/DIG. 8 |
| 4,138,341 | 2/1979 | Adams | 210/470 |
| 4,349,451 | 9/1982 | Friedman | 210/501.2 |
| 4,462,915 | 7/1984 | Friedman | 210/765 |

Primary Examiner—Richard V. Fisher
Assistant Examiner—Sharon T. Cohen
Attorney, Agent, or Firm—Lerner, David, Littenberg, Krumholz & Mentlik

[57] ABSTRACT

A method and system for filtering cooking oil in cooking vessels is disclosed. In accordance with the method and system, there is provided a collection vessel for collecting filtered oil, a filter member for filtering contaminants and particulate matter from the cooking oil, and a centrifugal pump apparatus which includes an impeller, an impeller discharge, and a flexible conduit having an inlet end connected to the impeller discharge and an outlet end. The filter member is supported in relation to the collection vessel so as to be in position to receive oil to be filtered, and then to discharge filtered oil into the collection vessel. The centrifugal pump apparatus is adapted to be placed directly in the cooking vessel so that at least the impeller thereof is in direct contact with the oil to be filtered, and the outlet end of the flexible conduit is arranged to be in position to discharge oil pumped therethrough into the filter member. When the centrifugal pump apparatus is operated, the impeller is rotated to thereby pump oil from the cooking vessel through the flexible conduit into the filter member. Also in accordance with the present invention, filtered cooking oil can be returned to the cooking vessel by simply removing the centrifugal pump apparatus from the cooking vessel, placing it in the collection vessel so that the impeller is in direct contact with the oil therein, and then operating the centrifugal pump apparatus to pump filtered oil from the collection vessel back into the cooking vessel.

25 Claims, 6 Drawing Figures

METHOD AND SYSTEM FOR FILTERING COOKING OIL

This is a continuation of application Ser. No. 304,653, filed Sept. 23, 1981, now U.S. Pat. No. 4,462,915.

FIELD OF THE INVENTION

The present invention relates to the filtration of cooking oil, and more particularly to a more simplified and reliable method and system for filtering cooking oil in cooking vessels to remove particulate matter therefrom.

BACKGROUND OF THE INVENTION

Cooking oil employed for the cooking of various foods must be periodically filtered in order to remove accumulated particulate matter and thereby permit repeated use of the cooking oil. Generally, it is desirable to perform such filtering operations directly in a kitchen of a cooking establishment so that after the cooking oil is filtered, it may be returned to the cooking vessel for immediate reuse. In many instances, it is also desirable to perform the filtering operation while the oil is hot, i.e., at an elevated temperature immediately after it has been used for cooking, so as to minimize the down-time of the cooking vessel. However, because the oil is hot, there is a risk of hazards and possible injury to personnel during the filtering operation. Consequently, various filtering methods and systems have been suggested which seek to minimize the chances of hot oil coming in contact with the operator or user during the filtering operation.

Some of the known filtration systems require significant suction or pressure requirements for drawing the hot cooking oil from the cooking vessel and forcing it across a suitable filtering medium. These systems consequently require relatively large pumping mechanisms and closed fluid systems for developing and maintaining the required pressure levels, and therefore are relatively expensive and complicated in nature.

Other filtering systems and methods are known which employ filter bags or members which operate on the principal of gravity, i.e., in which the hot cooking oil is simply discharged into the bag or member and allowed to pass therethrough by gravity, the particulate matter being collected in the bag and the filtered oil being discharged into a safety drain pot. However, even with these gravity type filtering systems, relatively large and bulky pumping apparatus have been required as well as specialized equipment and operations for removal of the cooking oil from the cooking fryer and subsequent return of the filtered cooking oil to the fryer.

For example, gravity type filtering systems have been employed with cooking vessels or fryers which are equipped with a drain valve for draining cooking oil from the fryer into an appropriate filter bag or member which serves to remove crumbs, sediment and other particulate matter from the oil before passing it into a collection vessel or drain pot. A rotary-pump apparatus having a suction hose and discharge hose is then employed to suck filtered oil from the drain pot through the suction hose and to then pump it through the discharge hose back into the fryer. Generally, a further filtering member is employed to receive the filtered oil from the discharge hose to provide a secondary filtering operation before the oil is returned to the cooking fryer.

A different but similar filtering system has also been employed with respect to cooking fryers which are not equipped with a drain valve. With these types of cooking fryers, the filtering system includes a rotary pump having a suction/discharge hose equipped with a nozzle for direct insertion into the cooking fryer for initially sucking hot oil from the cooking fryer through the suction/discharge hose and discharging it through a discharge tube into a first-stage filtering member which serves to filter out crumbs, sediment and other particulate matter and to discharge the filtered oil into a drain pot. When it is desired to return filtered oil to the cooking fryer, the discharge tube is replaced with a second suction hose, and the pump is reversed to then suck oil from the drain pot and discharge it through the suction/discharge hose into the cooking fryer. Again, a secondary filter member can be employed for receiving oil being pumped from the drain pot before its discharge into the cooking fryer.

With both of these latter types of prior art filtration systems, rotary-pumping apparatus which are relatively large and bulky are employed for pumping oil from one vessel into another vessel. Because rotary-pumping apparatus have the capability of greatly increasing the energy imparted to the fluid being pumped, if the suction and/or discharge hoses should become clogged, there is a possibility of a significant pressure build-up being developed in the oil which, in some instances, can cause the hoses to burst or leak, thereby spewing hot oil out of the hose and possibly injuring personnel in the kitchen. Thus, relatively thick-walled tubing must generally be employed in order to minimize these hazards. Also, such rotary-pumping apparatus, while performing adequately in most instances, do tend to produce significant wear on the pump parts, thereby requiring replacement or reservicing of the pump. Additionally, because such pumps require shaft seals, they are generally relatively expensive. Still further, with cooking fryers which are not equipped with drain valves, the filtering operation requires that the rotary pump be capable of operating in reverse, and additionally requires the changing of tubes and hoses in order to effect filtering of the oil and then the subsequent return of filtered oil to the fryer.

Accordingly, it is an object of the present invention to provide an improved method and system for filtering cooking oil in cooking fryers which is more reliable and of a simpler design and operation, and which achieves the same or superior degree of effectiveness and performance as prior art filtering systems and methods.

SUMMARY OF THE INVENTION

In accordance with the present invention, there is provided a method of filtering cooking oil in a cooking vessel which includes the steps of initially providing a collection vessel, a filtering member, and a centrifugal pump apparatus, which centrifugal pump apparatus includes an impeller, an impeller discharge, and a flexible conduit having an inlet end coupled in fluid communication with the impeller discharge and an outlet end. The filter member is supported in relation to the collection vessel so as to be in position to receive oil to be filtered and to then discharge filtered oil into the collection vessel. The centrifugal pump apparatus is placed directly in the cooking vessel so that at least the impeller thereof is in direct contact with the oil to be filtered in the cooking vessel, and the outlet end of the flexible conduit is arranged so as to be in position to discharge oil into the filter member. The centrifugal pump apparatus is then operated to rotate the impeller to thereby pump the oil from the cooking vessel through the flexible conduit into the filter member where it is then filtered and discharged into the collection vessel.

The use of a centrifugal pump apparatus for pumping of the hot oil is most advantageous as such pumps are of a relatively simplified nature and are not subjected to the high wear conditions encountered with the rotary pumps employed in the prior art. Additionally, the centrifugal pump apparatus may be of a relatively compact size so that the actual pump apparatus may be placed directly into the cooking vessel with the impeller in direct contact with the cooking oil therein. Thus, only a single fluid conduit is required for pumping of the oil from the cooking vessel. This allows for an efficient and reliable manner of pumping the cooking oil, particularly in comparison to the prior art rotary pumps which are generally floor-mounted units and require a pair of conduits, one leading from the rotary pump to the cooking vessel and the other leading from the pump to the discharge vessel. The compact size of the centrifugal pump is also advantageous in terms of storing the centrifugal pump apparatus when it is not being used.

A further advantage relating to the use of a centrifugal pump apparatus is that the pressure or energy imparted to the oil by the pump apparatus may be made relatively small, it only being necessary to be sufficient to effect a transfer of the oil from the cooking vessel to the filter member. This is in contrast to the prior art systems in which it was necessary to impart sufficient energy to the oil to force or suck it through the filter medium. Furthermore, even if restrictions should be formed in the flexible conduit employed in accordance with the present invention, the centrifugal pump apparatus is not capable of generating a sufficiently high pressure to cause the flexible conduit to leak or burst, thereby spewing hot oil into the surrounding environment and possibly injuring personnel in the area. Thus, the safety performance characteristics are also generally improved.

Still further, in accordance with the preferred embodiment, the same centrifugal pump apparatus may be employed, without any modifications or changes, both for pumping cooking oil from the cooking vessel to the collection vessel and for pumping filtered cooking oil from the collection vessel to the cooking vessel. All that is required is transferring the compact centrifugal pump apparatus from the cooking vessel to the collection vessel and arranging the outlet end of the flexible conduit to discharge the oil into the cooking vessel.

Also in accordance with the preferred embodiment of the present invention, it is possible to use the centrifugal pump apparatus to mix a treatment material with the oil, such as for example, a composition of water and porous rhyolite carrier for causing soluble contaminants in the oil to be removed or precipitate out of the oil and be captured by the filter during the filtering operation. Specifically, in accordance with the preferred embodiment, the outlet end of the flexible conduit may be supported by the housing of the centrifugal pump apparatus to mix the treatment material with the oil and recirculate same in the cooking vessel. This thus provides a much simpler system for mixing the treatment material with the oil and, in particular, does not require a manual stirring operation as was generally required in the prior art.

The filtering system in accordance with the present invention includes an oil-containing vessel containing a cooking oil to be filtered, an oil-receiving vessel for receiving cooking oil which has been filtered, a filter member for filtering the cooking oil, and a centrifugal pump apparatus which includes an impeller, an impeller discharge and a flexible conduit having an inlet end coupled in fluid communication with the impeller discharge and an outlet end. The centrifugal pump apparatus is of a size which is adapted to be removably placed in the oil-containing vessel so that at least the impeller is in direct contact with the cooking oil to be filtered, and the outlet end of the flexible conduit is arranged with respect to the filter member to discharge oil into the filter member which in turn is supported in relation to the oil-receiving vessel so as to discharge filtered oil into the oil-receiving vessel.

Such an arrangement, as noted above with respect to the method in accordance with the present invention, advantageously results in a simplified system for more reliably, safely and efficiently filtering cooking oil. Also, preferably the centrifugal pump apparatus advantageously may be sized to be removably placed directly to the oil-receiving vessel for pumping filtered oil back into the cooking vessel, without any modifications or changes to the equipment being necessary. Also, the number of components for the system, and in particular, for the centrifugal pump apparatus, can be minimized, thereby reducing the cost of the equipment.

These and further features and characteristics of the present invention will be apparent from the following detailed description in which reference is made to the enclosed drawings which illustrate the preferred embodiment of the present invention.

DETAILED DESCRIPTION OF THE PREFERRED EMBODIMENT

Figure 1:
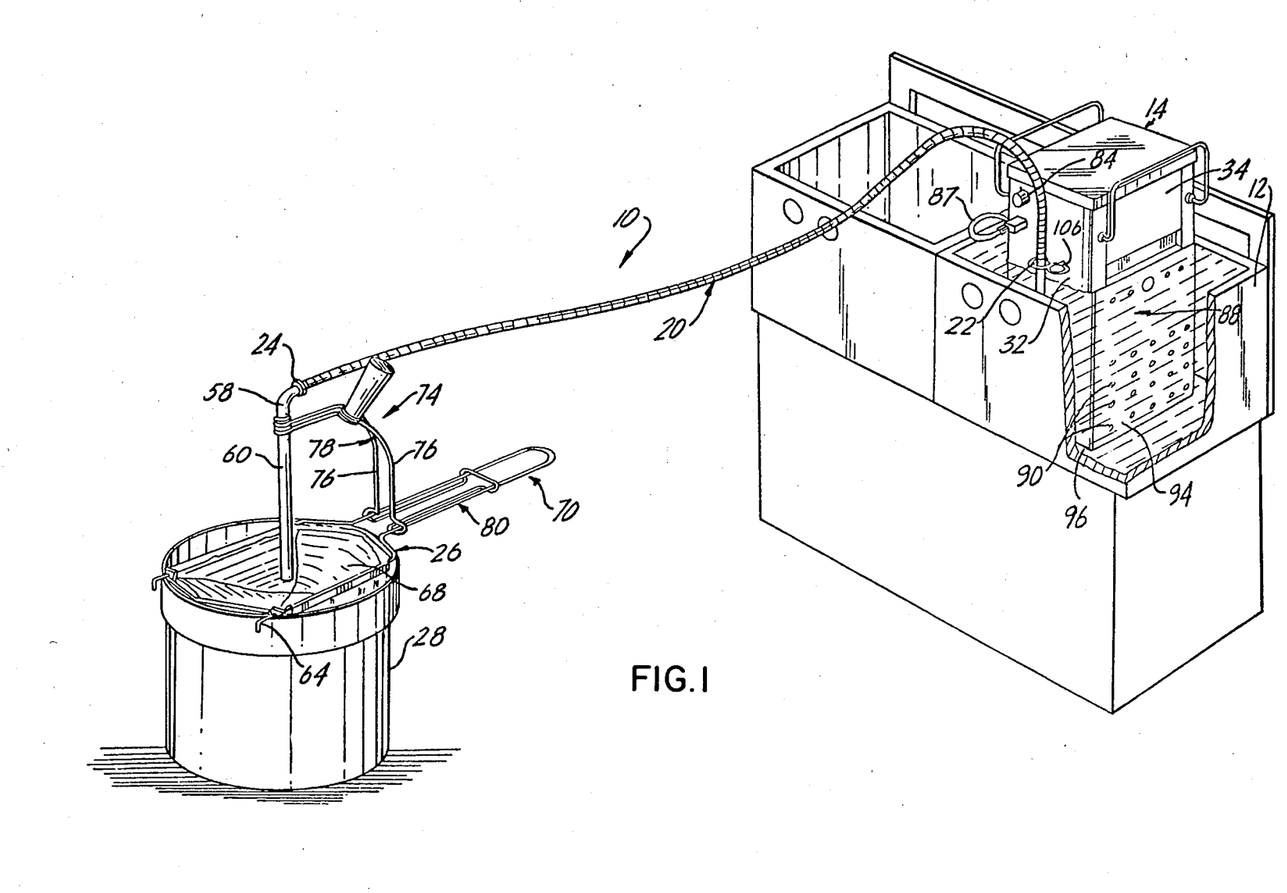
FIG. 1 is a perspective view of the filtering system in accordance with the present invention, illustrating cooking oil being pumped directly from a cooking fryer into a filter bag where the oil is then filtered and discharged into a drain vessel.

Referring now to the drawings wherein like reference characters represent like elements, there is illustrated in FIG. 1 a filtering system 10 in accordance with the present invention for filtering cooking oil in order to remove accumulated particulate matter therein. The cooking oil is contained in a suitable cooking vessel, such as for example a conventional cooking fryer 12 used in kitchens of restaurants and the like, and is generally employed for the cooking of various types of food products, such as for example, french fries, fried chicken, etc. During normal cooking operations, the food to be cooked is placed in a suitable container or basket (not shown) which is then immersed into the hot cooking oil to thereby cook the food. Typically, for cooking, the oil is at a temperature on the order of 325° to 375° F. During the cooking operation, the cooking oil in the fryer 12 picks up particulate matter and soluble contaminants and food juices from the food being fried. Consequently, periodically it is necessary to remove these impurities and particulate matter from the cooking oil before continued use, which is the function of the filtering system 10 of the present invention.

In accordance with the present invention, when it is desired to filter the cooking oil to remove the particulate material, a centrifugal pump apparatus 14 is employed for placement directly in the cooking fryer 12 having the cooking oil therein. Advantageously, the filtering operation can be performed immediately after a cooking operation while the cooking oil is still hot. The centrifugal pump apparatus 14 generally includes an impeller element 16 for driving cooking oil through an impeller discharge 18 into a flexible hose or conduit 20 having one end 22 coupled in fluid communication with the impeller discharge 18. The centrifugal pump apparatus 14 is placed in the cooking fryer 12 so that the impeller 16 thereof is in direct contact with the oil to be pumped, i.e., the oil which is in the cooking fryer 12 and which is to be filtered before reuse. The other free end 24 of the flexible conduit 20 is supported so as to discharge the oil being pumped therethrough into a suitable filter member 26 which is arranged in relation to a drain or collection vessel 28 to discharge filtered oil thereinto. During a filtering operation, the centrifugal pump apparatus 14 is operated to rotate the impeller 16 to pump the cooking oil from the cooking fryer 12 through the flexible conduit 20 into the filter member 26. When the hot oil containing the particulate material is discharged into the filter member 26, the particulate materials are trapped by the filter member 26 and the filtered oil allowed to pass therethrough into the drain or collection vessel 28 located therebeneath.

Figure 2:
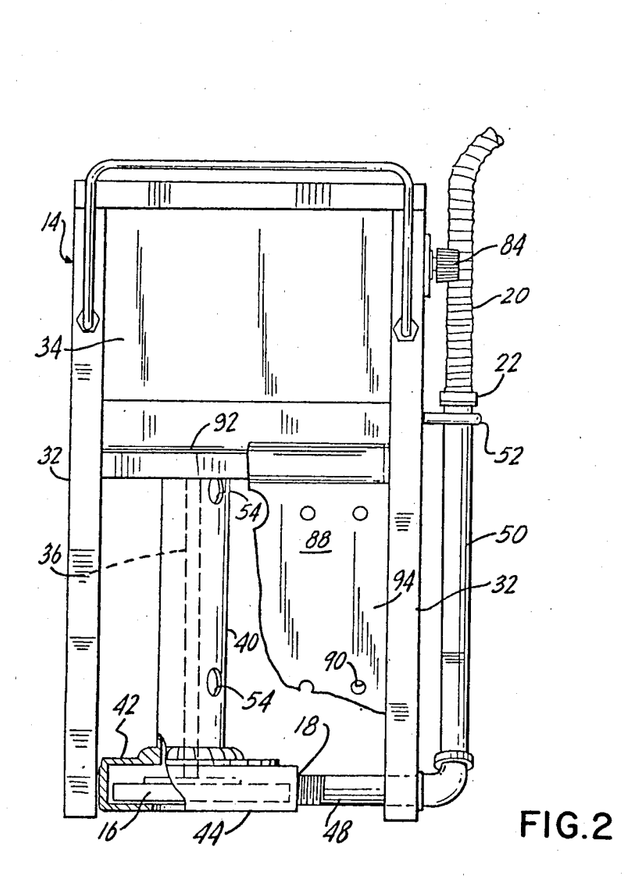
FIG. 2 is a side elevational view, partially broken away, of the centrifugal pump apparatus utilized in accordance with the present invention.
Figure 3:
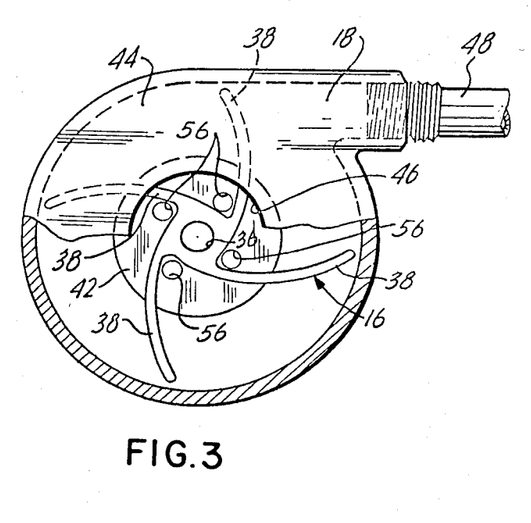
FIG. 3 is an end view, partially broken away and taken along the lines of 3—3 of FIG. 2, of the centrifugal pump apparatus utilized in accordance with the present invention.

The centrifugal pump apparatus 14 in accordance with the present invention, as best seen in FIGS. 2 and 3, includes a pair of spaced upstanding side plate members 32 which support, at their upper ends, an upper housing 34 containing a rotary motor (not shown) and suitable controls. The motor within the upper housing 34 includes a downwardly depending rotatable shaft 36 having the impeller element 16 secured to its lower end for rotation therewith. As best seen in FIG. 3, the impeller 16 includes a series of radially outwardly directed blades or vanes 38 which, when rotated, serve to impart a high velocity to the cooking oil in contact with the impeller element 16. A generally cylindrical hollow casing 40 is secured to the upper housing 34 in a suitable manner and surrounds the downwardly depending shaft 36. A laterally extending plate 42 is secured to the lower end of the casing 40, and has a hollow impeller chamber 44 mounted thereto and in which the impeller 16 is adapted to rotate. The bottom of the chamber 44 includes a central enlarged opening 46 for the passage of oil into the interior of the impeller chamber 44. The impeller chamber 44 includes a laterally extending discharge outlet 18 through which the oil is urged during a pumping operation. The discharge outlet 18 has a connection nipple 48 threadably secured thereto and which extends laterally through a suitable opening in one of the upstanding plate members 32. The outer end of the connection nipple 48 is directed upwardly and has an upstanding pipe or conduit section 50 coupled thereto. The upper end of the pipe 50 in turn is supported by a ring 52 secured by the plate member 32 and is coupled in any suitable manner to an outlet end 22 of a flexible conduit 20. Thus, the inlet end 22 of the flexible conduit 20 is coupled to be in fluid communication with the discharge opening 18. In accordance with the preferred embodiment, the flexible conduit 20 comprises a wire reinforced convoluted flexible hose made of Teflon. The wire reinforcement is for the purpose of maintaining the convolutions as well as acting as mechanical protection for abrasion.

As best seen in FIGS. 2 and 3, the bottom of the impeller chamber 44 is positioned to be at approximately the elevation of the bottom ends of the side plate members 32. Also, the cylindrical casing 40 is provided with a series of openings 54 through the wall thereof to permit oil in the fryer 12 to pass therethrough and flow downwardly through the interior of the casing 40. The plate member 42 includes a plurality of holes 56 therethrough to permit the oil in the casing 40 to flow into the impeller chamber 44.

When it is desired to pump oil from the fryer 12, the motor is operated to rotate the shaft 36 to in turn drive the impeller 16. As oil enters the impeller chamber 44, generally through the opening 46, both kinetic and potental energy is imparted to the oil by the blades or vanes 38, thereby forcing the oil at a relatively high velocity through the discharge outlet 18 in the chamber 44. As the oil leaves the impeller 16, the relatively high velocity thereof is converted or transformed into a pressure head for the oil to force the oil upwardly into the inlet end 22 of the flexible conduit 20. Centrifugal pumps are fundamentally high-speed machines which are connected to the drive motor directly. Because of their high-speed nature, such units are advantageously of a relatively small for a given rated flow and pressure, thereby reducing the required floor space, weight and initial cost of the unit. Also, as there are no rubbing parts, there consequently is no wear (except for the bearings which are readily accessible and generally do not require replacement during operation and use). Further, no internal valves are required to cause operating difficulties, and it is also possible to secure automatic regulation based on the flow, the suction pressure, or the discharge pressure which is involved.

The outlet end 24 of the flexible conduit 20 is adapted to be arranged to be in position to discharge cooking oil into a filter member 26. In this regard, a connection nipple 58 is suitably secured to the end 24 of the flexible conduit 20 and has a discharge nozzle 60 coupled thereto which is directed at an angle to the length of the flexible conduit 20.

The filter member 26 in accordance with the present invention preferably comprises a filter such as shown and disclosed in U.S. Pat. No. 4,052,319, which patent is hereby incorporated by reference. Briefly, however, the filter member 26, best seen in FIG. 4, includes a filter support structure 62 comprised of a pair of rod members 64, 66 and about which a filter bag 68 is supported. The rod member 64 advantageously is shaped to provide a U-shaped integral handle section 70 comprised of a pair of spaced sides 72. The filter bag 68 is provided with sleeve portions which are slipped over the rod members 64, 66 to thereby support the filter bag 68 on the filter support 62. The filter bag 68 preferably is formed of a smooth surface polyester or polytetrafluoroethylene material which can withstand elevated temperatures encountered in filtering hot cooking oil. Preferably, the filter bag 68 has a uniform pore size on the order of from about 40 to about 60 microns and has an open area from about 20% to about 30% of the total area. One particular preferred polyester comprises a MYLAR polyester.

Figure 4:
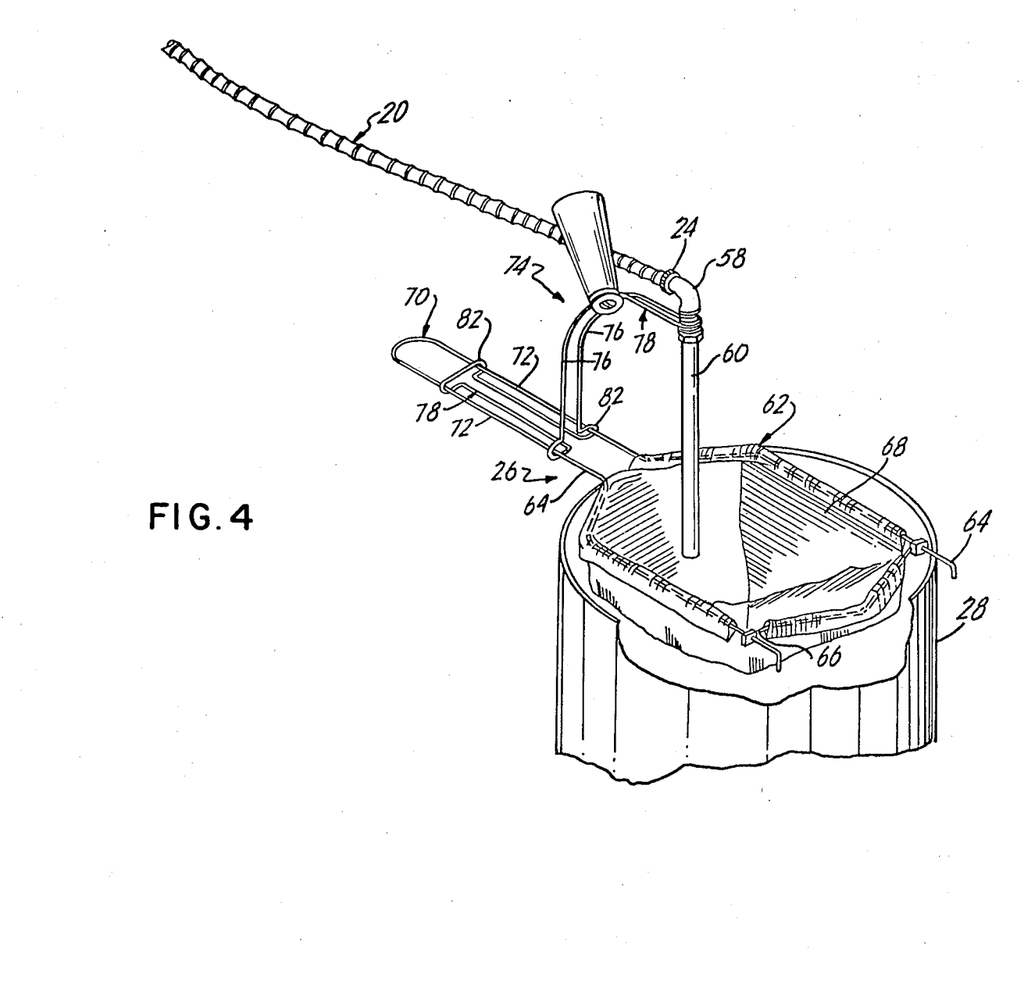
FIG. 4 is a perspective view illustrating the manner in which the outlet end of the flexible conduit is supported by the filter member in accordance with the present invention.
Figure 5:
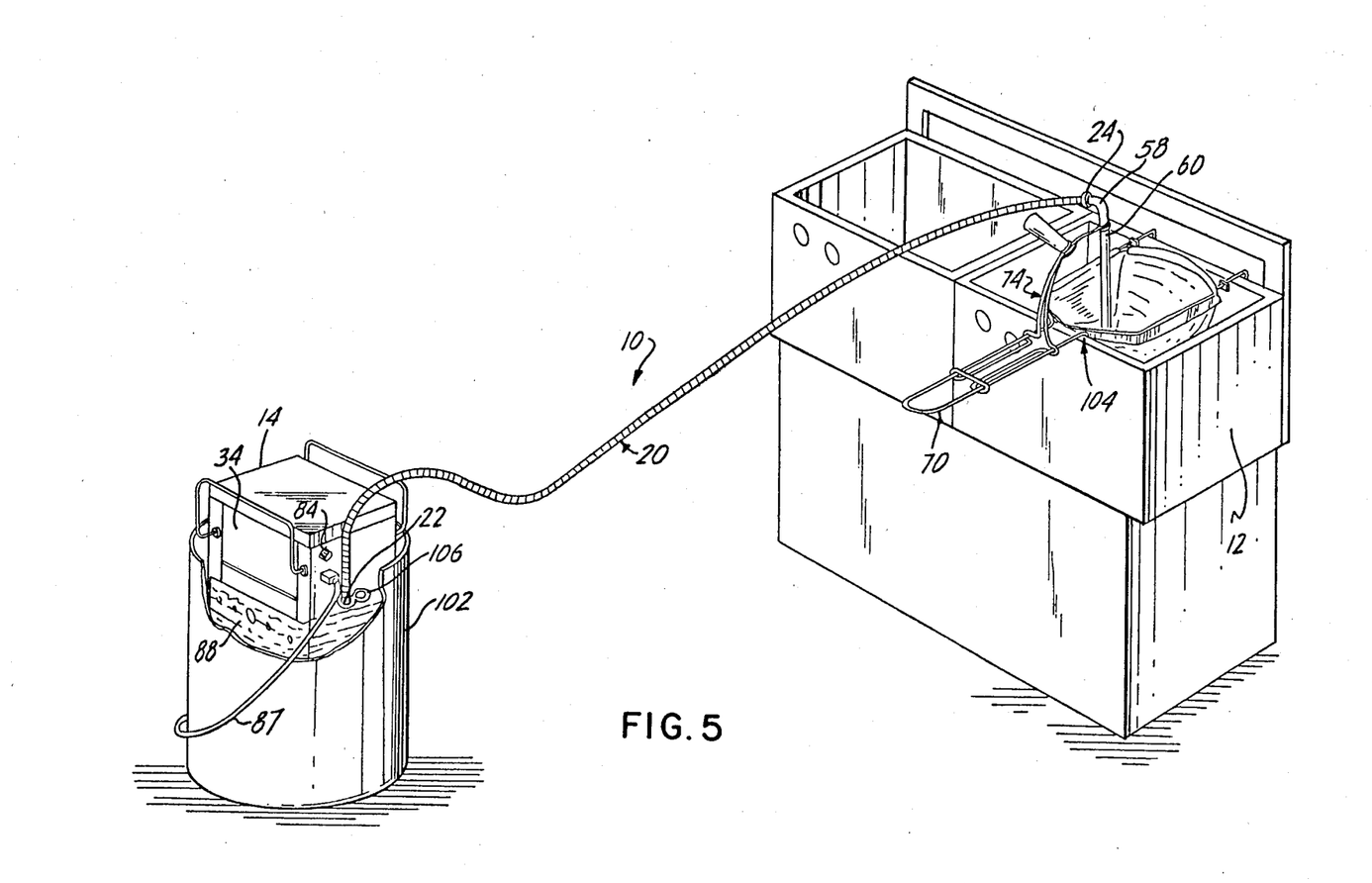
FIG. 5 is a perspective view, similar to that of FIG. 1, but illustrating the filtering system in accordance with the present invention being used to pump filtered oil from the drain pot back into the cooking fryer.

The use of such a filter bag 68 provides for a reduced filtration time and free filtering without clogging and can be easily cleaned, such as for example, by washing with hot water, for reuse. In particular, it is to be noted that such a filtering bag 68 permits the filtering of particulate matter from cooking oil by the means of gravity—i.e., it is not necessary to impart a sufficient pressure to the cooking oil to force the oil through the pores of the bag 68.

The filter member 26 is adapted to be supported in relation to the drain or collection vessel 28 so as to discharge filtered oil thereinto. In this regard, the ends of the support rod 64 and the handle 70 provide a convenient means to support the filter member 26 on the upper edge of the collection vessel 70. The collection vessel 28 should be of a size sufficient to receive an entire batch of cooking oil from the cooking fryer 12 so that the cooking oil may be completely pumped from the fryer 12 in one operation without having to change collection vessels:

In accordance with the preferred embodiment, the outlet end 24 of the flexible conduit 20 includes a suitable support member 74 for supporting the outlet end 24 on the filter member 26. This is particularly advantageous since an operator is not required to hold the outlet end 24 of the flexible conduit 20 to discharge the oil into the filter member 26 which might otherwise result in possible injury by the splattering of hot oil, etc. Instead, the operator need only assemble the support member 74 onto the filter member 26 and then turn on the centrifugal pump apparatus 14.

More particularly, in accordance with the preferred embodiment, the support member 74 for the outlet 74 end of the flexible conduit 20 comprises a wire support member having a pair of spaced, generally parallel rod or bar sections 76. At one end of the bar sections 76 are joined together, and at the other end are secured to the connection nipple 58 in a suitable manner. The wire support member 74 includes a first portion 78 which is curved and leads away from the connection nipple 58, and a second portion 80 for mounting the support member 74 on the handle 70 of the filter member 26. Specifically, the second portion 80 is provided with a pair of spaced looped portions 82 which are shaped to fit over the integral handle 70 of a filter member 26 to be supported thereby. The looped portions 82 are spaced from one another and include side recesses which are sized to receive the sides 72 of the handle 70 when the handle 70 is inserted through the pair of looped portions 82. This is similar to the support for the stirrer element of the filtered member shown and disclosed in U.S. Pat. No. 4,052,319. Because of the tight-fitting relationship between the recesses of the support member 74 and the sides 72 of the integral handle 70 on the filter member 26, once the support member 74 and handle 70 are assembled together the flexible conduit 20 will remain supported on the filter member 26. The curved first section 78 of the support member 74 is shaped and sized so that the outlet nozzle 60 of the flexible conduit is directed downwardly and is arranged to be centrally positioned with respect to the filter bag 68 located immediately therebeneath. In this manner, oil pumped through the flexible conduit 20 will be directed into the filter bag 68, and will then be filtered and discharged into the collection vessel 28.

In order to operate the system 10 to conduct a filtering operation, after the centrifugal pump apparatus 14 has been placed directly in the cooking fryer 12 and the outlet end 24 of the flexible conduit 20 assembled to the filter member 26 and supported on the collection vessel 28, the centrifugal pump apparatus 14 is turned on to thereby cause the impeller 16 to rotate. The rotation of the impeller 16 imparts a high velocity to cooking oil and forces it through the impeller discharge 18 into the flexible conduit 20 where the oil is then pumped to the outlet end 24 and deposited into the filter bag 68. The filter bag 68 then serves to filter out particulate matter while passing the hot oil therethrough to the collection vessel 28. In this regard, the centrifugal pump apparatus 14 preferably includes a suitable switch 84 having at least an "on" position 85 and an "off" position 86. When the switch 84 is in its "on" position 85, the rotary motion of the centrifugal pump 14 apparatus is powered to rotate the shaft 36 at a high speed to in turn rotate the impeller 16. When the switch 84 is in its "off" position 86, power to the motor is interrupted and rotation is not imparted to the impeller 16. Power for the motor may be provided by a suitable electrical cable 87.

Figure 6:
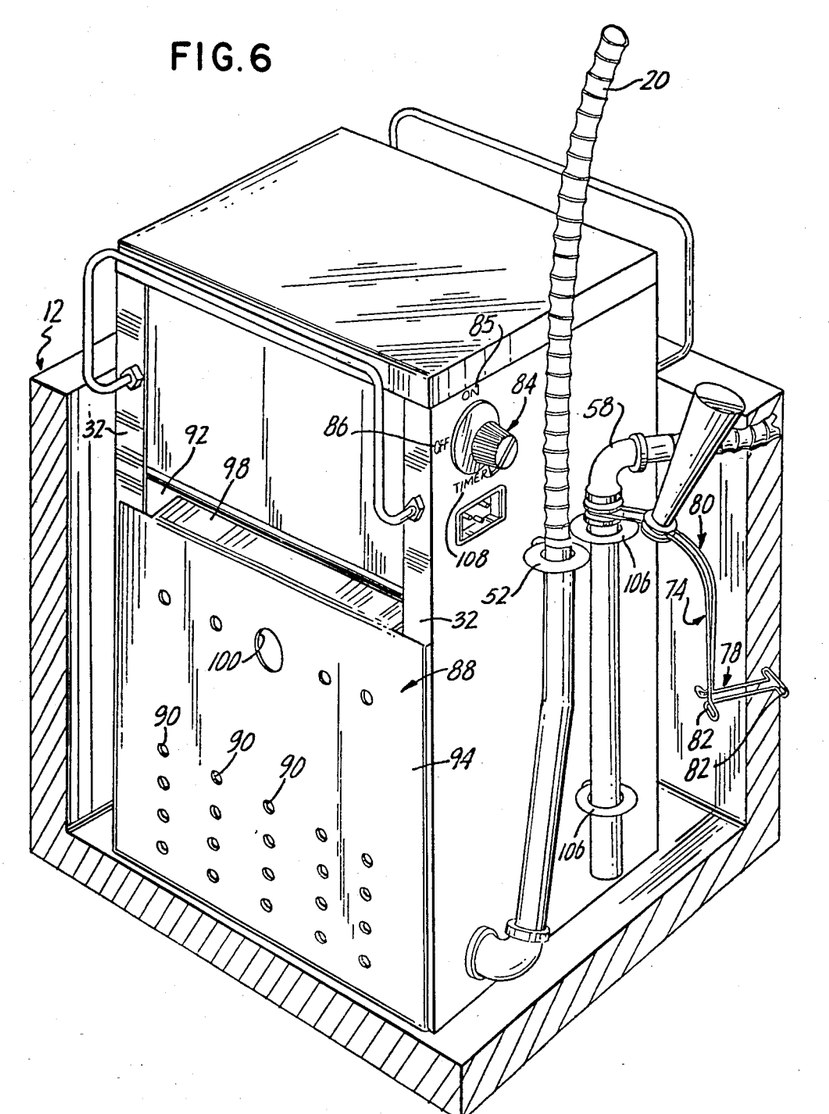
FIG. 6 is a perspective view of the centrifugal pump apparatus positioned in the cooking fryer for partially mixing a treatment material which has been deposited into the cooking oil, in accordance with the present invention.

In accordance with the preferred embodiment, the centrifugal pump apparatus 14 is provided with a U-shaped strainer member 88 having a series of flow openings 90 therethrough for closing off the open area between the side plate members 32. More particularly, as best seen in FIGS. 2 and 6, laterally-extending support shelves 92 are provided between the side plate members 32 along the opposite edges thereof at an elevation just below the upper housing 34. The strainer member 88 comprises a pair of generally upstanding sides 94 connected by a bottom plate 96. The upper end of each of the sides 94 is provided with a lip 98 for placement over the respective support shelves 92 to support the strainer member 88 on the side plate members 32. The strainer member 88 preferably is made with a suitable material such as stainless steel and is of a relatively thin-walled construction so as to be somewhat flexible. The strainer member 88 is assembled to the side plate members 32 by pulling outwardly onto the opposite sides 94 at the upper ends thereof, placing the bottom plate 96 of the U-shaped strainer 88 against the bottom of the plate members 32 and then allowing the upper ends to move inwardly so that the lips 98 are supported on the respective support shelves 92. An enlarged opening 100 may be provided in the sides 94 of the U-shaped strainer member 88 to permit the sides 94 to be pulled outwardly for assembly.

The strainer member 88 also includes a plurality of flow opening 90 in the sides 94 to permit cooking oil in the cooking fryer 12 to flow therethrough into the hollow interior of the centrifugal pump apparatus 14 defined by the sides 94 of the strainer member 88 and the side plate members 32. Thus, the hollow interior will be filled with cooking oil when the centrifugal pump apparatus 14 is placed in the cooking fryer 12. However, the strainer member 88 advantageously prevents the passage of large particulate material, such as for example, pieces of food left in the cooking fryer 12, from coming into contact with the impellar 16 or impellar chamber 44 and possibly blocking off the flow of oil to the flexible conduit 20. In the preferred embodiment, the flow openings 90 are on the order of one-quarter inch in diameter.

After the cooking oil has been pumped from the cooking fryer 12 into the collection vessel 28, it is then necessary to return filtered cooking oil to the cooking fryer 12. This can be accomplished quite easily in accordance with the present invention by simply removing the centrifugal pump apparatus 14 from the cooking fryer 12 and placing it in a container or vessel 102 having filtered oil therein. This is best illustrated in FIG. 4. In this regard, the vessel 102 of filtered oil can comprise the collection vessel 28 into which the filtered oil has been discharged, or may comprise a separate additional collection vessel. Preferably, in order to avoid having to remove the filter member 26 from the collection vessel 28 immediately after the hot oil has been pumped from the cooking fryer 12, a separate vessel 107 containing filtered oil is utilized. In either instance, however, the centrifugal pump apparatus 14 after it is removed from the cooking fryer 12, is placed into the vessel 102 containing filtered oil, and the outlet end 24 of the flexible conduit 20 is arranged to be in position to discharge filtered oil into the cooking fryer 12. As the centrifugal pump apparatus 14 may possibly be contaminated with particulate matter after having been placed in the cooking fryer 12, and/or in order to provide further filtration, it is preferably that a filter member 104 be interposed between the outlet end 24 of the flexible conduit 20 and the cooking fryer 12 for returning completely filtered oil to the cooking fryer 12. The filter member 104 can comprise a separate filter member which has pores of a finer size than the pores or openings in the filter member 26 used in connection with the pumping of cooking oil from the cooking fryer 12, or could comprise the very same filter member 26. Also, depending on the amount of contaminants and particulate matter removed from the oil during the first filtering operation, the original filtering member 26 could be cleaned before reuse in connection with the return of the cooking oil to the cooking fryer 12.

The operation for returning filtered cooking oil to the cooking fryer 12 is then accomplished by simply turning on the centrifugal pump apparatus 14 to pump the filtered cooking oil from the vessel 107 through the flexible conduit 20 to discharge same into the filter member 104 where further particulate matter is removed, the fully filtered oil then being discharged into the cooking fryer 12. Again, in the preferred embodiment, the outlet end 24 of the flexible conduit 20 is supported by the filter member 104 which in turn is supported on the upper end of the cooking fryer 12 into which the cooking oil is to be returned.

Still further in accordance with the present invention, the filtering system 10 is particularly advantageous when used in connection with a treatment material for aiding in the removal of impurities and other contaminants which may be in the cooking oil. More particularly, in pending U.S. patent application Ser. No. 157,849, entitled FRYER OIL TREATMENT COMPOSITION AND METHOD filed in the name of Bernard Friedman, now U.S. Pat. No. 4,349,451 (which is hereby incorporated by reference), there is disclosed a preferred treatment composition and method for aiding in the removal of soluble contaminants and food juices from food which has been fried. The composition as disclosed in such copending application preferably comprises water and a porous rhyolite carrier which serves to remove or neutralize the effect of certain undesirable impurities from the used cooking oil, such as for example, soluble food juices and fatty acids which may have an adverse effect on the cooking oil. Often times with such treatment materials, it is necessary to stir and mix the treatment material into the cooking oil. In the past, such stirring or mixing operations have generally been performed manually with a suitable stirring element. This, as can be appreciated, is undesirable as it not only takes up the time of the personnel working in the kitchen, but also involves possible hazardous working conditions, particularly in view of the fact that such treatment material is generally added and stirred while the cooking oil is hot. Also often times where such materials must be stirred for a certain period of time to insure their proper mixture with the cooking oil, the stirring operation has not been completely and fully performed.

In accordance with the present invention, the centrifugal pumping apparatus 14 may be utilized to effect such stirring and mixing automatically. More particularly, the centrifugal pump apparatus 14 is provided with a pair of spaced ring members 106 secured to one of the upright side plate members 32 which are adapted to receive the outlet end 24 of the flexible conduit 20 and hold some thereinplace (see FIG. 6). After the centrifugal pump apparatus 14 is placed into the cooking fryer 12 with the end 24 supported in the holding rings 106, the centrifugal pump apparatus 14 is operated to recirculate the cooking oil and treatment material directly in the cooking fryer 12, thereby serving to completely mix the treatment material with the oil. For example, the treatment material may simply be poured into the cooking fryer 12 and the pumping apparatus 14 then turned on for a specified period of time to insure proper mixing of the treatment material with the hot cooking oil.

Still further in accordance with this aspect of the preferred embodiment, the pump apparatus 14 preferably is equipped with a timer mechanism of a conventional design and the switch 84 includes a third position 108 for activating the timer to power the motor for a specified period of time (See FIG. 6). Such timer mechanisms for driving a motor for a preset period of time are well-known in the art. After the period of time has elapsed, the switch 84 is automatically returned to the "off" position 86. This particular feature is most advantageous as it does not require personnel to manually stire the treatment material into the cooking oil, thereby freeing the personnel to perform their other duties in the kitchen. Also, such a timer feature is advantageous in insuring that the required mixing of the treatment material and oil is performed.

As noted above, the centrifugal pumping apparatus 14 is sized so as to be adapted to be placed directly in the cooking vessel or fryer 12. As it is generally the width of the cooking fryer 12 which is the limiting size, the lateral dimensions of the centrifugal pump apparatus 14 are of a size which is smaller than the width of the cooking fryer 12, thereby permitting it to be placed directly into the fryer 12. For example, in the preferred embodiment, the side plate members 32 are on the order of approximately 6 inches in width and are spaced from one another on the order of approximately 8 inches. The height of the apparatus 14 is chosen so that the upper housing 34 is not immersed in the cooking oil when the centrifugal pump apparatus 14 is placed in the cooking fryer 12. This dimension may vary depending on the size of the cooking fryers with which the apparatus 14 is to be used. In the preferred embodiment, the support shelves 92 are located approximately 8½ inches above the bottom edge of the plate members 32.

One advantageous feature in accordance with the present invention results from the fact that the pumping apparatus 14 may be directly placed into the cooking vessel or fryer 12 and supported by the bottom thereof for pumping the hot oil from the cooking fryer 12. With the prior art systems, particularly those which are not provided with drains, it was necessary to manually hold a suction nozzle in the cooking fryer and operate the pump. This presented possible safety hazards during the operation, such as splattering of oil, and burning or injuring personnel in the vicinity.

After the cooking oil has been pumped from the cooking fryer 12, the centrifugal pump apparatus 14 is removed and the cooking fryer 12 is cleaned in the conventional manner. Thereafter, the centrifugal pump apparatus 14 may be placed into a vessel 102 having filtered oil and the oil then pumped into the cooking fryer 12. No time-consuming operations of changing nozzles, hoses, etc. are required, nor is it necessary to provide a reversable motor. Thus, the method and system 10 in accordance with the present invention advantageously provides for a simpler filtering operation and one which is more reliable and safe.

A further advantage of the present invention is that suitable pressure heads can be provided utilizing a much smaller motor than was previously required in connection with a rotary-pump apparatus. For example, with the rotary-pump apparatus, the motors utilized generally were on the order of one-third horsepower; however, with the centrifugal pump apparatus 14 in accordance with the present invention, the motor may be on the order of only one-twentieth horsepower. Still further, the centrifugal pump apparatus 14 in accordance with the present invention has a generally longer life and is more reliable over a greater period of time than the rotary pumps of the prior art. Specifically, no shaft seals are required with a centrifugal pump, and wear surfaces are minimized. Also close tolerances are not required for the various components. Consequently the centrifugal pump apparatus 14 in accordance with the present invention is expected to have a life on the order of five to ten years, whereas rotary pumps of the prior art generally had a useful life on the order of one to three years. Thus, the cost of the equipment necessary for the filtering operation is minimized.

Another advantage resulting from use of a centrifugal pump apparatus 14 as opposed to a rotary pump is that high pressure heads generally are not created. For example, the rotary pumps of the prior art have the potential to create a very high pressure differentials, generally on the order of 60 psi. In order to keep the pressure differential at an acceptable level, it was thus necessary to insure that no restrictions were created in the hoses or conduits which might otherwise serve to create too great a pressure differential between the inside and the outside of the hose, thereby causing same to leak or burst and spewing hot oil into the surrounding environment. On the other hand, with the centrifugal pump apparatus 14 in accordance with the present invention, a low pressure differential is utilized for driving the oil from the cooking fryer 12 into the filter member 26, and high potential pressure differentials such as are created with rotary pumps will not be experienced. Thus, potential hazards experienced with the prior art filtering apparatus are minimized.

Therefore, in accordance with the present invention, there is provided a method of filtering cooking oil from a cooking vessel 12 comprising the steps of providing a collection vessel 28, a filter member 26, and a centrifugal pump apparatus 14, the centrifugal pump apparatus 14 including an impeller 16, an impeller discharge 18, and a flexible conduit 20 having an inlet end 22 coupled in fluid communication with the impeller discharge 18 and an outlet end 24. The filter member 26 is supported in relation to the collection vessel 28 so as to be in a position to receive oil to be filtered and to discharge filtered oil into the collection vessel 28 after it has been filtered by the filter member 26. The centrifugal pump apparatus 14 is placed directly in the cooking vessel 12 so that at least the impeller 16 is in direct contact with the oil to be filtered in the cooking vessel 12. The outlet end 24 of the flexible conduit 20 is arranged to be in position to discharge oil into the filter member 26. Thereafter, the centrifugal pump apparatus 14 is simply turned on to rotate the impeller 16 to pump the cooking oil from the cooking vessel 12 through the flexible conduit 20 into the filtering member 26 to remove particulate matter and other contaminants in the oil, thus providing a filtered oil. In accordance with the preferred embodiment, thereafter the centrifugal pump apparatus 14 may be removed from the cooking vessel 12 and placed in a filtered oil vessel (either the collection vessel 28 or a separate vessel 102 containing filtered oil). The outlet end 24 of the flexible conduit 20 is then arranged so as to be in position to discharge oil into the cooking vessel 12, and the centrifugal pump apparatus 14 operated to rotate the impeller 16 to pump oil from the filtered oil vessel 28, 102 through the flexible conduit 20 into the cooking vessel 12. If desired, a separate filter member 104 may be provided for the operation of returning filtered oil to the cooking vessel 12.

In accordance with the filtering system 10 of the present invention, there is provided an oil-containing vessel, such as a cooking vessel or fryer 12, containing a cooking oil to be filtered, an oil-receiving vessel 28 for receiving cooking oil that has been filtered, a filter member 26 for filtering cooking oil, and a centrifugal pump apparatus 14. The centrifugal pump apparatus 14 includes an impeller 16, an impeller discharge 18 and a flexible conduit 20 having an inlet end 22 coupled in fluid communication with the impeller discharge 18 and an outlet end 24. The centrifugal pump apparatus 14 is of a size adapted to be removably placed in the oil-containing vessel 12 so that at least the impeller 16 is in direct contact with the cooking oil to be filtered, and the outlet end 24 of the flexible conduit 20 is arranged with respect to the filter member 26 to discharge oil into the filter member 26. Means 84 are provided for operating the centrifugal pump apparatus 14 to rotate the impeller 16 to thereby pump cooking oil from the oil-containing vessel 12 through the flexible conduit 20 into the filter member 26.

While the preferred embodiment of the present invention has been shown and described, it will be understood that such is merely illustrative and that changes may be made without departing from the scope of the invention as claimed.

What is claimed is:

1. A method of filtering cooking oil in a cooking vessel, comprising the steps of:

providing a collection vessel, a filter member, and a centrifugal pump apparatus, said centrifugal pump apparatus including an impeller, an impeller discharge, a flexible conduit having an inlet end coupled in fluid communication with said impeller discharge and an outlet end, and a housing having a hollow interior in which said impeller is located, and housing being of a size and configuration for supporting said centrifugal pump apparatus in free-standing relationship on a base of a vessel;

supporting said filter member in relation to said collection vessel so as to be in position to receive oil to be filtered and to discharge filtered oil into said collection vessel after it has been filtered by said filter member;

placing said centrifugal pump apparatus directly in said cooking vessel so that said housing is supported on the base of said cooking vessel and so that at least said impeller is in direct contact with said oil to be filtered in said cooking vessel;

arranging said outlet end of said flexible conduit so as to be in position to discharge oil into said filter member; and operating said centrifugal pump apparatus to rotate said impeller to pump said oil from said cooking vessel through said flexible conduit into said filter member.

2. The method of claim 1 further including the step of treating said cooking oil with a treatment material to remove predetermined contaminants contained in said cooking oil prior to operating said centrifugal pump apparatus to pump cooking oil from said cooking vessel.

3. The method of claim 2 wherein said step of treating comprises depositing said treatment material into said cooking oil, supporting said outlet end of said flexible conduit to be in position to discharge oil into said cooking vessel after said centrifugal pump apparatus has been placed into said cooking vessel, and rotating said impeller of said centrifugal pump apparatus to pump and mix said oil and said treatment material in said cooking vessel at least prior to said steps of arranging and operating.

4. The method of claim 3 wherein said treatment material comprises a composition comprising water and porous rhyolite carrier.

5. The method of claim 1 wherein said step of arranging said outlet end of said flexible conduit to discharge oil into said filter member comprises supporting said outlet end of said flexible conduit on said filter member, and wherein said step of supporting said filter member comprises supporting said filter member on said collection vessel.

6. The method of claim 5 wherein said filter member includes an integral handle having spaced elongated opposite sides, wherein said flexible conduit includes a support member adjacent said outlet end, said support member having loop portions which are adapted to fit over and receive portions of said spaced opposite sides of said integral handle, and wherein said step of supporting said outlet end of said flexible conduit comprises mounting said loop portions of said support member onto said spaced opposite sides of said integral handle.

7. The method of claim 1 wherein said filter member comprises a filter bag formed from a material selected from the group consisting of polyester and polytetrafluoroethylene materials, said filter bag having a uniform pore size of from about 40 to about 60 microns and an open area of from about 20% to about 30% of the total area.

8. A method of filtering cooking oil in a cooking vessel, comprising the steps of:

providing a collection vessel, a filter member, and a centrifugal pump apparatus, said centrifugal pump apparatus including an impeller, an impeller discharge, a flexible conduit having an inlet end coupled in fluid communication with said impeller discharge and an outlet end, and a housing having a hollow interior in which said impeller is located, said housing being of a size and configuration for supporting said centrifugal pump apparatus in free-standing relationship on a base of a vessel;

supporting said filter member in relation to said collection vessel so as to be in position to receive oil to be filtered and to discharge filtered oil into said collection vessel after it has been filtered by said filter member;

placing said centrifugal pump apparatus directly in said cooking vessel so that said housing is supported on the base of said cooking vessel and so that at least said impeller is in direct contact with said oil to be filtered in said cooking vessel;

arranging said outlet end of said flexible conduit so as to be in position to discharge oil into said filter member;

operating said centrifugal pump apparatus to rotate said impeller to pump said oil from said cooking vessel through said flexible conduit into said filter member; and removing said centrifugal pump apparatus from said cooking vessel after oil has been pumped therefrom, and then returning filtered cooking oil to said cooking vessel.

9. The method of claim 8 wherein said step of returning filtered cooking oil to said cooking vessel comprises placing said centrifugal pump apparatus into a filtered oil vessel having filtered cooking oil therein so that said housing is supported on the base of said filtered cooking oil vessel and so that at least said impeller is in direct contact with said oil in said filtered oil vessel; arranging said outlet end of said flexible conduit so as to be in position to discharge oil into said cooking vessel; and operating said centrifugal pump apparatus to rotate said impeller to pump said oil from said filtered oil vessel through said flexible conduit into said cooking vessel.

10. The method of claim 9 wherein said filter member comprises a first filter, and further including the step of placing a second filter member between said cooking vessel and said outlet end of said flexible conduit when said centrifugal pump apparatus is placed in said filtered oil vessel to receive oil from said flexible conduit and to discharge oil therein into said cooking vessel.

11. The method of claim 10 wherein said filtered oil vessel comprises said collection vessel.

12. The method of claim 10 wherein said first filter member has openings of a predetermined size to allow oil to pass therethrough, and wherein said second filter member has openings to allow oil to pass therethrough, said openings to said second filter member being of a size which is smaller than said predetermined size of said openings of first filter member.

13. A method of filtering cooking oil in a cooking vessel, comprising the steps of:

providing a collection vessel, a filter member, and a centrifugal pump apparatus, said centrifugal pump apparatus including an impeller, an impeller discharge, and a flexible conduit having an inlet end coupled in fluid communication with said impeller discharge and an outlet end;

removably supporting said filter member on said collection vessel so as to be in position to receive oil to be filtered and to discharge filtered oil into said collection vessel after it has been filtered by said filter member;

placing said centrifugal pump apparatus directly in said cooking vessel so that at least said impeller is in direct contact with said oil to be filtered in said cooking vessel;

removably supporting said outlet end of said flexible conduit on said filter member so as to be in position to discharge oil in said filter member; and operating said centrifugal pump apparatus to rotate said impeller to pump said oil from said cooking vessel through said flexible conduit into said filter member.

14. The method of claim 13 wherein said filter member includes an integral handle having spaced elongated opposite sides, wherein said flexible conduit includes a support member adjacent said outlet end, said support member having loop portions which are adapted to fit over and receive portions of said spaced opposite sides of said integral handle, and wherein said step of supporting said outlet end of said flexible conduit comprises mounting said loop portions of said support member onto said spaced opposite sides of said integral handle.

15. A filtering system for cooking oil comprising, in combination:
an oil-containing vessel containing a cooking oil to be filtered;
an oil-receiving vessel for receiving cooking oil which has been filtered;
a filter member for filtering cooking oil, said filter member including means for supporting said filter member in relation to said oil-receiving vessel to receive oil to be filtered from said oil-containing vessel and to deposit filtered cooking oil into said oil-receiving vessel;
a centrifugal pump apparatus which includes an impeller, an impeller discharge, a flexible conduit having an inlet end coupled in fluid communication with said impeller discharge and an outlet end, and a housing having a hollow interior in which said impeller is located, said housing being of a size and configuration for supporting said centrifugal pump apparatus in free-standing relationship on the base of said oil-containing vessel so that at least said impeller is in direct contact with said cooking oil to be filtered, and said outlet end of said flexible conduit being adapted to be arranged with respect to said filter member to discharge oil into said filter member; and
means for operating said centrifugal pump apparatus to rotate said impeller to pump said cooking oil from said oil-containing vessel through said flexible conduit into said filter member.

16. The filtering system of claim 15 further including support means for supporting said outlet end of said flexible conduit on said filter member.

17. The filtering system of claim 16 wherein said filter member includes an integral handle having spaced elongated opposite sides, and wherein said support means comprises a support member adjacent to said outlet end of said flexible conduit, said support member having loop portions which are adapted to fit over and receive portions of said opposite sides of said integral handle to support said outlet end of said flexible conduit on said integral handle.

18. The filtering system of claim 15 wherein said oil-containing vessel comprises a cooking fryer.

19. The filtering system of claim 15 wherein said housing further includes holder means for holding said outlet end of said flexible conduit in a position to discharge oil therethrough directly into said oil-containing vessel when said outlet end is held by said holder means.

20. The filtering system of claim 15 wherein said means for operating said centrifugal pump apparatus comprises a switch movable between a first position and a second position, said impeller being rotated when said switch is in said first position.

21. The filtering system of claim 20 wherein said centrifugal pump apparatus includes timer means, and wherein said switch is movable to a third position for actuating said timer means to cause said impeller to rotate for a predetermined time.

22. The filtering system of claim 15 wherein said oil-receiving vessel is of a size adapted to removably receive said centrifugal pump apparatus so that said centrifugal pump apparatus may be removably placed into said oil receiving vessel with said housing supporting said centrifugal pump apparatus in free-standing relationship on the base of said oil-receiving vessel with said impeller being in direct contact with filtered cooking oil in said oil-receiving vessel.

23. The filtering system of claim 15 wherein said filter member comprises a filter bag formed from a material selected from the group consisting of polyester and polytetrafluoroethylene materials, said filter bag having a uniform pore size of from about 40 to about 60 microns and an open area of from about 20% to about 30% of the total area.

24. A filtering system for cooking oil comprising, in combination;
an oil-containing vessel containing a cooking oil to be filtered;
an oil-receiving vessel for receiving cooking oil which has been filtered;
a filter member for filtering cooking oil, said filter member including means for removably supporting said filter member on said oil-receiving vessel to receive oil to be filtered from said oil-containing vessel and to deposit filtered oil into said oil-receiving vessel;
a centrifugal pump apparatus which includes an impeller, an impeller discharge, and a flexible conduit having an inlet end coupled in fluid communication with said impeller discharge and an outlet end, said centrifugal pump apparatus being of a size adapted to be removably placed in said oil-containing vessel so that at least said impeller is in direct contact with said cooking oil to be filtered;
support means for removably supporting said outlet end of said flexible conduit on said filter member; and
means for operating said centrifugal pump apparatus to rotate said impeller to pump said cooking oil from said oil-containing vessel through said flexible conduit into said filter member.

25. The filtering system of claim 24 wherein said filter member includes an integral handle having spaced elongated opposite sides, and wherein said support means comprises a support member adjacent to said outlet end of said flexible conduit, said support member having loop portions which are adapted to fit over and receive portions of said opposite sides of said integral handle to support said outlet end of said flexible conduit on said integral handle.

* * * * *

UNITED STATES PATENT AND TRADEMARK OFFICE
CERTIFICATE OF CORRECTION

PATENT NO. : 4,578,196
DATED : March 25, 1986
INVENTOR(S) : Bernard Friedman

It is certified that error appears in the above-identified patent and that said Letters Patent is hereby corrected as shown below:

Column 3, lines 38-39, "generally" should read --greatly--.

Column 13, line 8, delete "and" (first occurrence) and insert --said--.

Column 14, line 61, "to" should read --of--.

Signed and Sealed this

Twenty-ninth Day of July 1986

[SEAL]

Attest:

DONALD J. QUIGG

Attesting Officer

Commissioner of Patents and Trademarks